April 20, 1948.  F. C. FRANK  2,439,926
WHEEL
Filed Aug. 17, 1944  5 Sheets-Sheet 1

INVENTOR
FREDERICK C. FRANK
BY
T. J. Plante
ATTORNEY

April 20, 1948. F. C. FRANK 2,439,926
WHEEL
Filed Aug. 17, 1944 5 Sheets-Sheet 2

INVENTOR
FREDERICK C. FRANK
BY
ATTORNEY

April 20, 1948.　　　　F. C. FRANK　　　　2,439,926
WHEEL
Filed Aug. 17, 1944　　　　5 Sheets-Sheet 3

INVENTOR
FREDERICK C. FRANK
BY
ATTORNEY

April 20, 1948. F. C. FRANK 2,439,926
WHEEL
Filed Aug. 17, 1944 5 Sheets-Sheet 4

INVENTOR
FREDERICK C. FRANK
BY
G. J. Plante
ATTORNEY

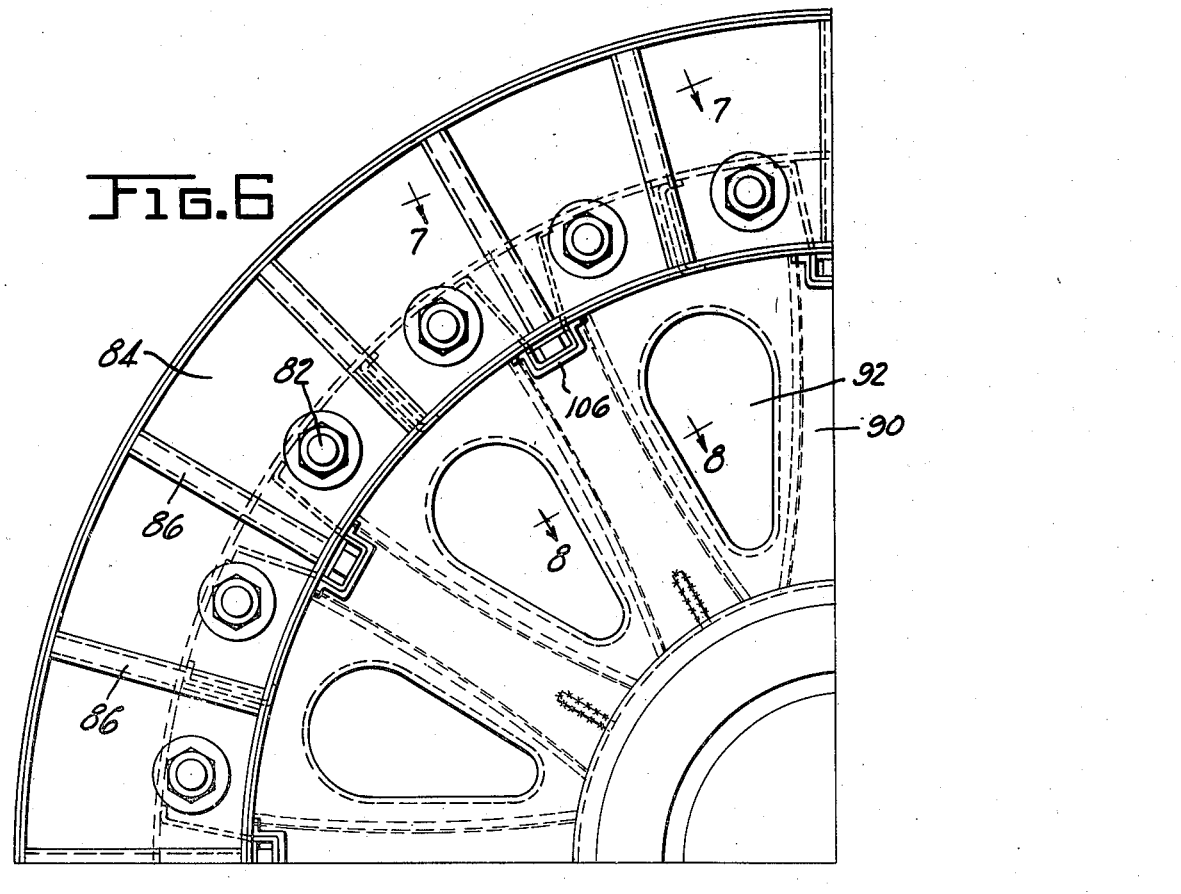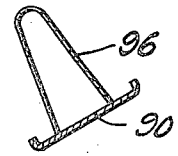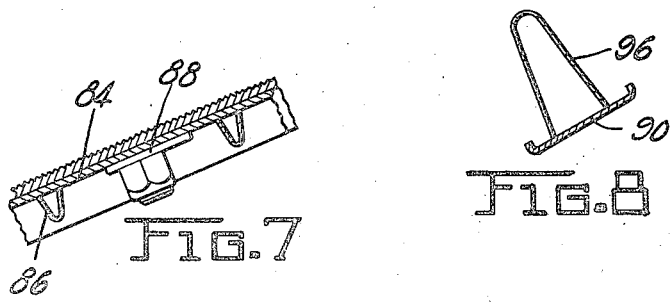

Patented Apr. 20, 1948

2,439,926

UNITED STATES PATENT OFFICE 2,439,926

WHEEL

Frederick C. Frank, South Bend, Ind., assignor to Bendix Aviation Corporation, South Bend, Ind., a corporation of Delaware Application August 17, 1944, Serial No. 549,856

10 Claims. (Cl. 301—73)

This invention relates to wheels and in particular to wheels adapted for use on airplanes, although not necessarily limited to such use.

An object of the invention is to provide a very light wheel, which nevertheless possesses adequate strength.

Another object of the invention is to utilize wrought material in the fabrication of the wheel, since wrought material is better able to withstand alternating stresses than the cast material now used.

Still another object of the invention is to fabricate in as simple and efficient a fashion as possible a wheel having the foregoing advantages.

Other objects and advantages of the invention will become apparent during the course of the following description, reference being had therein to the accompanying drawings, in which:

Figure 6 is a partial end view of the wheel construction of Figure 4; and

Figures 7 and 8 are sections taken on the lines 7—7 and 8—8 respectively of Figure 6.

Figure 1:
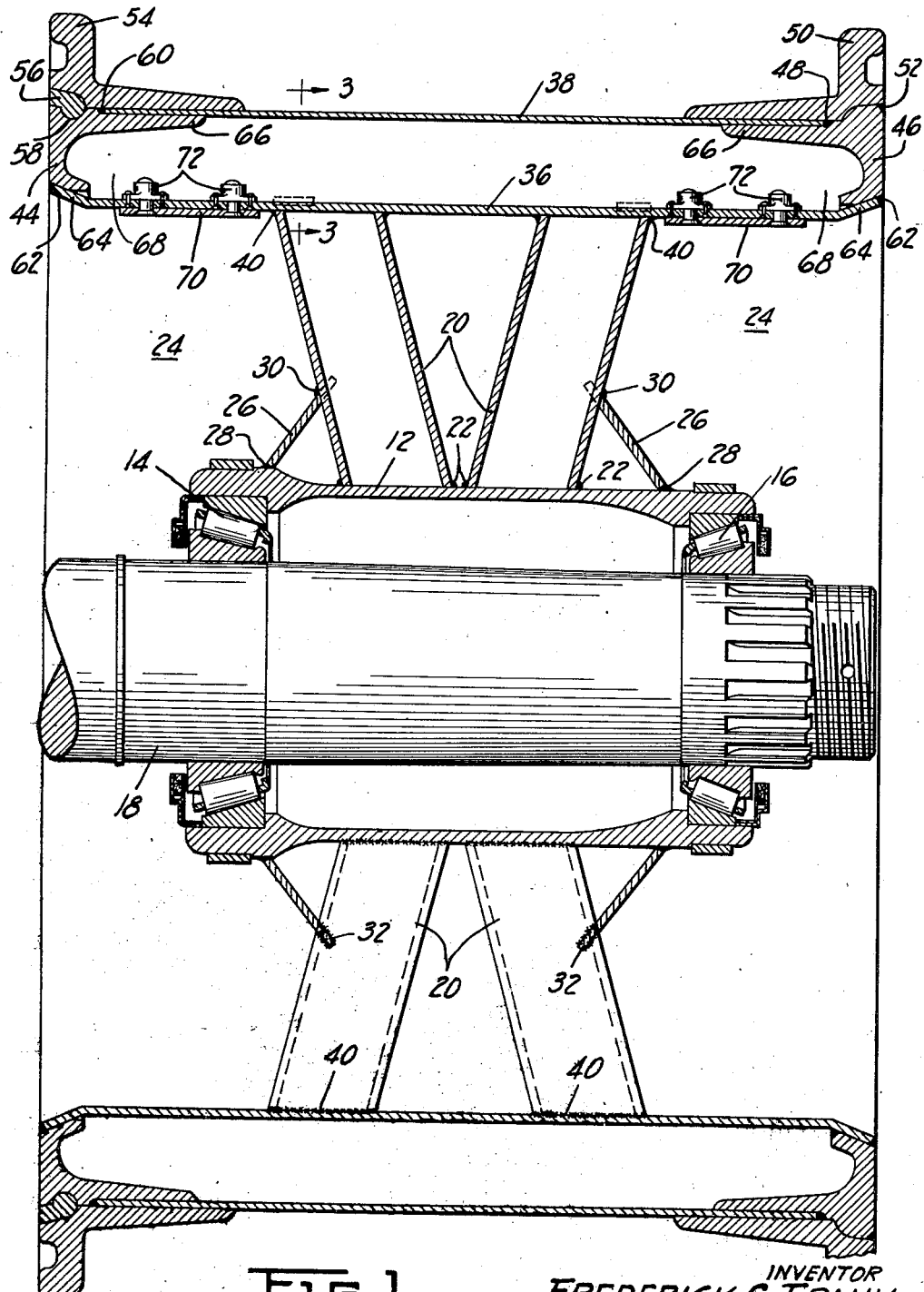
Figure 1 is a vertical section taken through a wheel construction embodying my invention, the section being taken on the line 1—1 of Figure 2.
Figure 2:
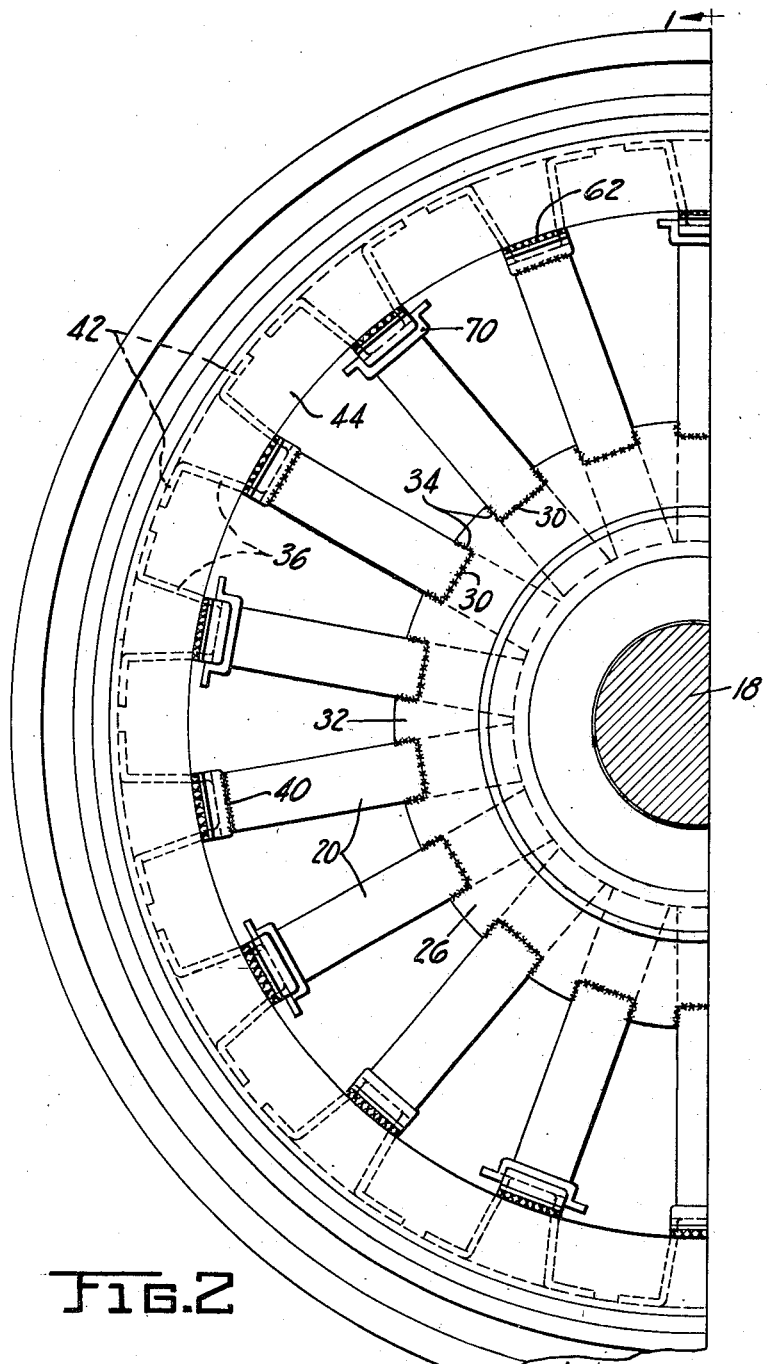
Figure 2 is a partial end view of the wheel construction shown in Figure 1.
Figure 3:
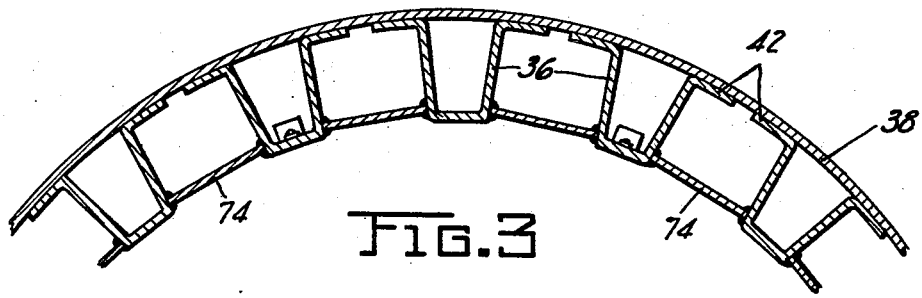
Figure 3 is a partial section taken on the line 3—3 of Figure 1.
Figure 5:
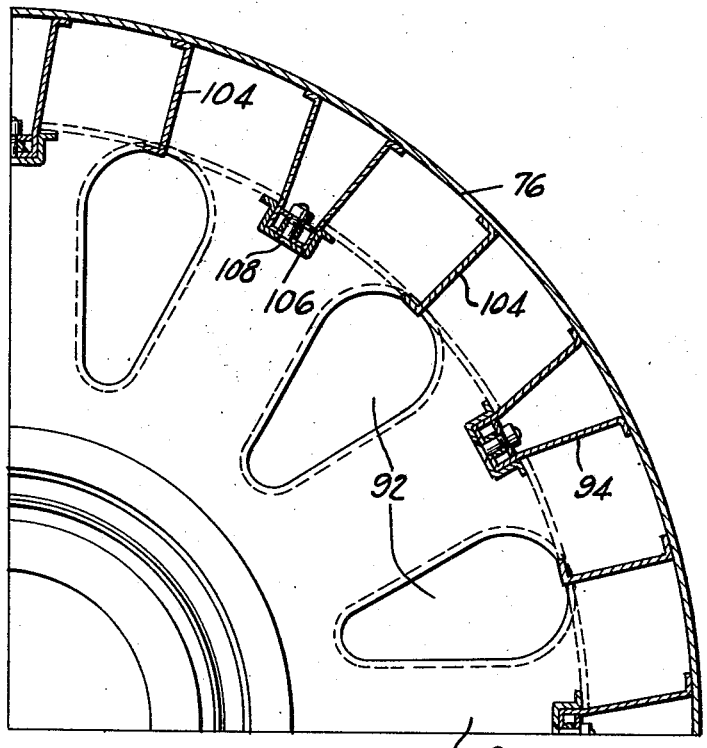
Figure 5 is a section taken on the line 5—5 of Figure 4.
Figure 4:
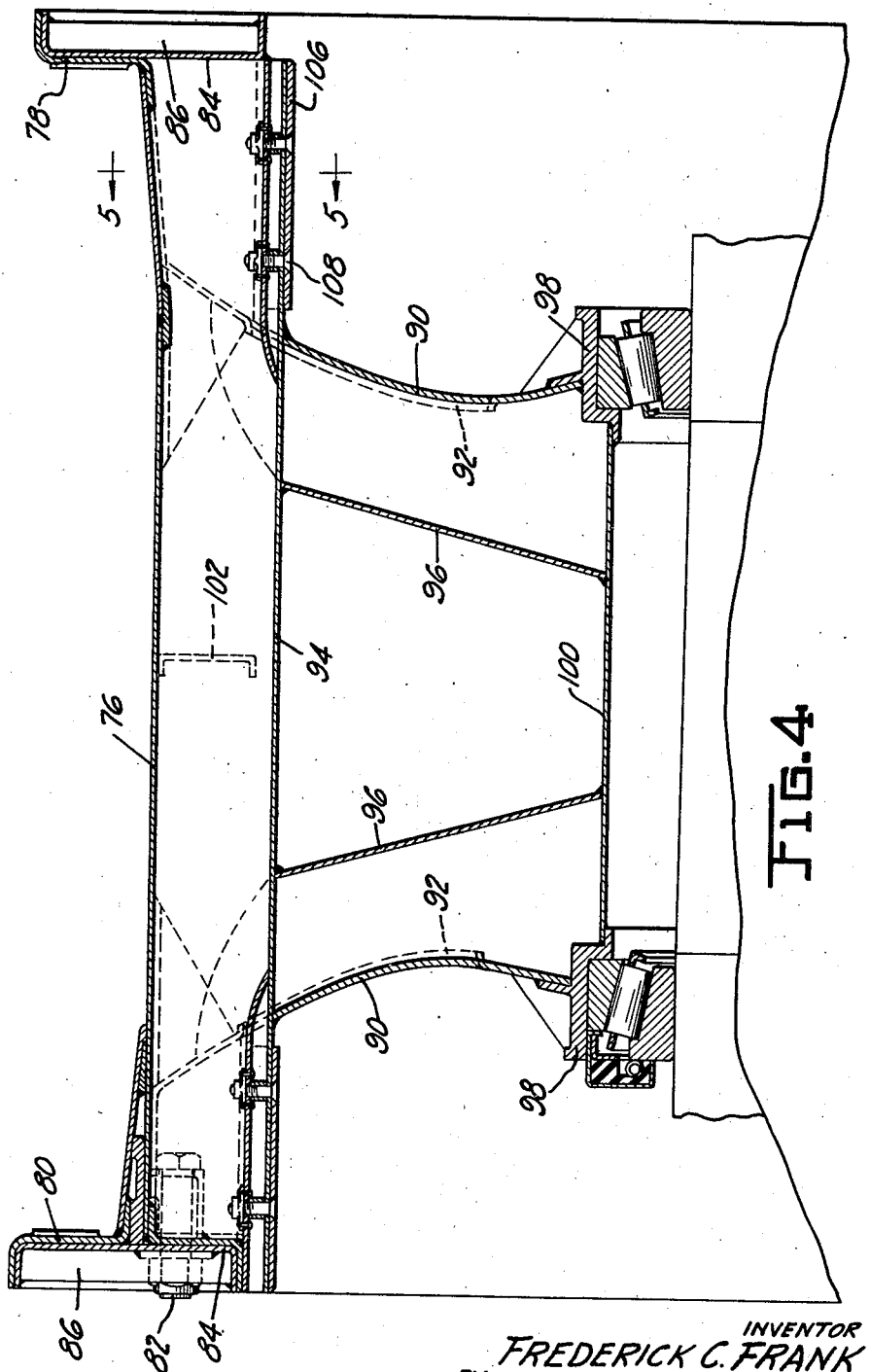
Figure 4 is a vertical section taken through a wheel construction showing a further embodiment of my invention.

Referring to the embodiment of Figures 1 to 3, the numeral 12 indicates the hub of the wheel, within which the usual bearings 14 and 16 are supported on the axle 18. While I prefer to form the hub by forging, any other suitable method, such as forming from tubing, or stamping two halves and securing them together, may be used without departing from the scope of the present invention.

A plurality of hollow rectangular spokes 20 are secured at their inner end to the hub 12, preferably by welding, as indicated at 22. The hollow spokes 20 are preferably formed as extrusions, although they may also be drawn tubing. The spokes are preferably arranged in pairs as shown, said pairs being circumferentially spaced around the hub. Each of the spokes is inclined with respect to the vertical, the arrangement being such that the spokes of each pair are closer to one another at their inner, or hub, ends than at their outer ends. This inclination of the spokes with respect to the vertical has the advantage that it brings the upper ends of the spokes nearer to the outer edges of the wheel where the load is concentrated (and thus reduces the cantilever arms through which this load acts), and also provides room for the necessary brake cavities 24.

Added support for the spokes is provided by means of two conical braces 26, one at each side of the wheel, which are welded to the hub at 28, and to each of the spokes, as shown at 30. Also, the braces 26 may have radial extensions 32 extending between each pair of adjacent spokes and welded thereto as shown at 34.

A plurality of circumferentially spaced horizontal U-section beams 36 are arranged to support the rim 38 of the wheel. Each of these U-section beams is secured to and supported by a pair of spokes, the base of the U preferably being welded to the outer ends of the spokes as shown at 40. Flanges 42 at the outer ends of the U arms are welded to the rim 38.

The U-section beams 36 may be formed by extruding or rolling, while the rim 38 is a formed sheet metal tube.

In order to give added support to the rim, annular reinforcing members 44 and 46 are provided, one at each side of the wheel. The members 44 and 46, which are preferably formed as extrusions, aid in taking the concentrated load at the outer edges of the wheel. The reinforcing member 46 may be welded to the rim 38 as shown at 48, and may also be secured to a tire retaining flange 50 by means of the weld indicated at 52. The tire retaining flange 54 at the opposite side of the wheel is demountable, and is retained in position by a C ring 56 which fits into a groove 58 in reinforcing member 44. Reinforcing member 44 also may be secured to the edge of the rim 38 by welding, as indicated at 60. As shown at 62, the inner edge of each of the reinforcing members 44 and 46 is welded to each of the U-section beams at one end thereof, the beams being provided with upturned-end extensions 64 against which the reinforcing members lie. Each of the reinforcing members 44 and 46 may have an inwardly extending flange 66 extending for some distance along the underside of the rim, and if this is the case, the ends 68 of the U-section beams must be cut away as shown in Figure 1 to conform to the shape of the reinforcing members.

A plurality of steel caps 70 may be secured as shown at 72 to some of the U-section beams to serve as driving keys for the rotors of disc brakes which may be located in each of the brake cavities 24. These brakes may be made according to the principles explained in William H. DuBois application Serial No. 449,722, filed July 4, 1942, now Patent No. 2,423,881.

To give additional circumferential support to the U-section beams, a plurality of small strut members 74 may be used, each welded at one end to one of the U-section beams and at the other end to the next U-section beam (see particularly Figure 3). As shown, there are two series of these strut members 74 (see Figure 1).

Figures 4 to 8 inclusive show a modified version of my invention. In this embodiment, the numeral 76 indicates a typical flat base rim having a fixed tire retaining flange 78 at one side and a demountable tire retaining flange 80 at the other side, held in place by means of bolts 82. In order to obtain rigidity, and at the same time to provide means for fastening the demountable flange 80 to the rim, an annular channel section member 84 having U-shaped stiffening ribs 86 and bolt hole reinforcements 88 may be welded to the demountable bead flange 80 to form an integral unit. A similar annular channel section member 84 provided with U-shaped stiffening ribs 86 may be provided at the opposite side of the wheel.

The load carrying members of the wheel proper consist of discs 90 having flanged oval shaped openings 92 through the web portion and U-shaped openings at the periphery to allow a plurality of circumferentially spaced U-shaped stringers or beams 94 to extend through the openings in the discs, said beams being welded to the discs. In order to strengthen the discs, a plurality of U-shaped strengthening ribs 96 may be secured by welding to the discs 90 and to the beams 94.

When inserted into rim 76 and welded thereto, the discs 90, beams 94, and ribs 96 form a spoke-like structure which in turn is welded to bearing housings 98 and hub barrel 100, the hub barrel being secured to each of the bearing housings.

In the event that a flat tire occurs, the channel section 102 welded to the inside of the rim prevents flattening thereof.

Auxiliary rim supporting channel section members 104, located midway between the U-section beams 94, may help support the load on the rim 76.

Hardened steel guides 106 act as keys for the rotating members of a disc brake, the guides 106 being secured to the respective beams 94 by means of bolts 108.

While I prefer to use U-section stiffening ribs 86 and 96, there is no reason why any other structural section such as I-section, inverted T-section, channel section, or the like, cannot be used.

In both the embodiment shown in Figures 1 to 3, and that shown in Figures 4 to 8, the provision is made for dual brakes, one at each side of the wheel. If a single brake were to be used, the outer brake cavity could be eliminated, and the outer support could be brought directly under the tire retaining flange at that side of the wheel.

In fabricating either the wheel shown in Figures 1 to 3, or that shown in Figures 4 to 8, any of the rolled sheet metals may be used, such as any of the various grades of steel, aluminum alloy, or magnesium alloy.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A wheel comprising a hub, a plurality of pairs of hollow rectangular-section extruded spokes spaced circumferentially about said hub, each spoke being inclined with respect to the vertical in such a way that the outer ends of each pair of spokes are spaced farther apart than their inner ends, a plurality of U-section horizontal extruded beams, each supported on a pair of the spokes, the outer end of each spoke being welded to one of the beams and the inner end of each spoke being welded to the hub, an annular frusto-conical brace at each side of the wheel inclined in the opposite direction to the inclination of the spokes on the same side of the wheel and welded at its outer end to the sides of the spokes and at its inner end to the hub, extensions on the conical braces projecting between the circumferentially arranged spokes and welded thereto, flanges at the outer end of each arm of each U-shaped beam, a tubular rim supported on and welded to said flanges, an annular extruded reinforcing member at each side of the wheel welded along its outer edge to the respective side of the rim and at its inner edge to extensions of the U-section horizontal beams, a plurality of reinforcing struts welded to and located between the sides of adjacent U-section beams near the base of the U to provide additional circumferential support for the beams, said struts being arranged in two series, one near each side of the wheel, and tire retaining flanges at each side of the rim, one of which is demountable.

2. A wheel comprising a hub, a plurality of pairs of hollow rectangular-section extruded spokes spaced circumferentially about said hub, each spoke being inclined with respect to the vertical in such a way that the outer ends of each pair of spokes are spaced farther apart than their inner ends, a plurality of U-section horizontal extruded beams, each supported on a pair of the spokes, the outer end of each spoke being welded to one of the beams and the inner end of each spoke being welded to the hub, an annular frusto-conical brace at each side of the wheel inclined in the opposite direction to the inclination of the spokes on the same side of the wheel and welded at its outer end to the sides of the spokes and at its inner end to the hub, extensions on the conical braces projecting between the circumferentially arranged spokes and welded thereto, flanges at the outer end of each arm of each U-shaped beam, a tubular rim supported on and welded to said flanges, an annular extruded reinforcing member at each side of the wheel welded along its outer edge to the respective side of the rim and at its inner edge to extensions of the U-section horizontal beams, and a plurality of reinforcing struts welded to and located between the sides of adjacent U-section beams near the base of the U to provide additional circumferential support for the beams.

3. A wheel comprising a hub, a plurality of pairs of hollow rectangular-section extruded spokes spaced circumferentially about said hub, each spoke being inclined with respect to the vertical in such a way that the outer ends of each pair of spokes are spaced farther apart than their inner ends, a plurality of U-section horizontal extruded beams, each supported on a pair of the spokes, the outer end of each spoke being secured to one of the beams and the inner end of each spoke being secured to the hub, an annular frusto-conical brace at each side of the wheel inclined in the opposite direction to the inclination of the spokes on the same side of the wheel and secured at its outer end to the sides of the spokes and at its inner end to the hub, flanges at the outer end of each arm of each U-shaped beam, a tubular rim supported on and secured to said flanges, an annular extruded reinforcing member at each side of the wheel secured at its outer edge to the respective side of the rim and at its inner edge to extensions of the U-section horizontal beams, and a plurality of reinforcing struts welded to and located between the sides of adjacent U-section beams near the base of the U to provide additional circumferential support for the beams.

4. A wheel comprising a hub, a plurality of pairs of hollow rectangular-section spokes spaced circumferentially about said hub, each spoke being inclined with respect to the vertical in such a way that the outer ends of each pair of spokes are spaced farther apart than their inner ends, a plurality of U-section horizontal beams, each supported on a pair of the spokes, the outer end of each spoke being secured to one of the beams and the inner end of each spoke being secured to the hub, an annular frusto-conical brace at each side of the wheel inclined in the opposite direction to the inclination of the spokes on the same side of the wheel and secured at its outer end to the sides of the spokes and at its inner end to the hub, flanges at the outer end of each arm of each U-shaped beam, a tubular rim supported on and secured to said flanges, and an annular reinforcing member at each side of the wheel secured at its outer edge to the respective side of the rim and at its inner edge to extensions of the U-section horizontal beams.

5. A wheel comprising a hub, a plurality of pairs of hollow rectangular-section spokes spaced circumferentially about said hub, each spoke being inclined with respect to the vertical in such a way that the outer ends of each pair of spokes are spaced farther apart than their inner ends, a plurality of U-section horizontal beams, each supported on a pair of the spokes, the outer end of each spoke being secured to one of the beams and the inner end of each spoke being secured to the hub, flanges at the outer end of each arm of each U-shaped beam, a tubular rim supported on and secured to said flanges, and an annular reinforcing member at each side of the wheel secured at its outer edge to the respective side of the rim and at its inner edge to extensions of the U-section horizontal beams.

6. A wheel comprising a hub, a plurality of pairs of hollow spokes spaced circumferentially about said hub, each spoke being inclined with respect to the vertical in such a way that the outer ends of each pair of spokes are spaced farther apart than their inner ends, a plurality of U-section horizontal beams, each supported on a pair of the spokes, the outer end of each spoke being secured to one of the beams and the inner end of each spoke being secured to the hub, a tubular rim supported on and secured to said beams, and an annular reinforcing member at each side of the wheel secured at its outer edge to the respective side of the rim and at its inner edge to the U-section horizontal beams.

7. A wheel comprising a hub, a plurality of pairs of spokes spaced circumferentially about said hub, each spoke being inclined with respect to the vertical in such a way that the outer ends of each pair of spokes are spaced farther apart than their inner ends, a plurality of horizontal beams, each supported on a pair of the spokes, the outer end of each spoke being secured to one of the beams and the inner end of each spoke being secured to the hub, a rim supported on and secured to said beams, and an annular reinforcing member at each side of the wheel secured at its outer edge to the respective side of the rim and at its inner edge to the horizontal beams.

8. In a wheel having a hub and rim, means connecting said hub and rim comprising a plurality of pairs of spokes spaced circumferentially about said hub, a plurality of horizontal beams, each supported on a pair of the spokes, the outer end of each spoke being secured to one of the beams and the inner end of each spoke being secured to the hub, and an annular reinforcing member at each side of the wheel secured at its outer edge to the respective side of the rim and at its inner edge to the horizontal beams.

9. In a wheel having a hub and rim, means connecting said hub and rim comprising a plurality of pairs of spokes spaced circumferentially about said hub, a plurality of horizontal beams, each supported on a pair of the spokes, the outer end of each spoke being secured to one of the beams and the inner end of each spoke being secured to the hub, and an annular brace at each side of the wheel secured at its outer end to the sides of the spokes and at its inner end to the hub.

10. In a wheel having a hub and rim, means connecting said hub and rim comprising a plurality of pairs of spokes spaced circumferentially about said hub, each spoke being inclined with respect to the vertical in such a way that the outer ends of each pair of spokes are spaced farther apart than their inner ends, a plurality of horizontal beams, each supported on a pair of the spokes, the outer end of each spoke being secured to one of the beams and the inner end of each spoke being secured to the hub, and an annular brace at each side of the wheel secured at its outer end to the sides of the spokes and at its inner end to the hub.

FREDERICK C. FRANK.

REFERENCES CITED

The following references are of record in the file of this patent:

UNITED STATES PATENTS

| Number | Name | Date |
| --- | --- | --- |
| 721,380 | Morgan | Feb. 24, 1903 |
| 1,240,003 | Anderson | Sept. 11, 1917 |
| 1,395,615 | Stock | Nov. 1, 1921 |
| 1,421,128 | Clark | June 27, 1922 |